United States Patent
Bourjac et al.

(10) Patent No.: US 7,523,889 B2
(45) Date of Patent: Apr. 28, 2009

(54) MODULAR ANTI-ICING/DE-ICING DEVICE FOR AN AERODYNAMIC SURFACE

(75) Inventors: Didier Bourjac, Marignane (FR); Gerard Cuadrado, Carry le Rouet (FR)

(73) Assignee: Eurocopter, Marignane (FR)

( * ) Notice: Subject to any disclaimer, the term of this patent is extended or adjusted under 35 U.S.C. 154(b) by 387 days.

(21) Appl. No.: 11/008,194

(22) Filed: Dec. 10, 2004

(65) Prior Publication Data

US 2005/0184193 A1     Aug. 25, 2005

(30) Foreign Application Priority Data

Dec. 12, 2003   (FR)   .................................. 03 14616

(51) Int. Cl.
*B64D 15/12*     (2006.01)
(52) U.S. Cl. ............... 244/134 D; 244/134 R; 416/39
(58) Field of Classification Search ............. 244/134 R, 244/134 A, 134 D, 134 F, 134 E, 1 R; 416/39
See application file for complete search history.

(56) References Cited

U.S. PATENT DOCUMENTS

| | | | | | |
|---|---|---|---|---|---|
| 2,494,625 | A | * | 1/1950 | Erle | 244/134 D |
| 2,499,034 | A | * | 2/1950 | Park | 244/134 D |
| 2,540,472 | A | * | 2/1951 | Boyd et al. | 219/201 |
| 2,552,075 | A | * | 5/1951 | Van Daam | 244/134 D |
| 3,002,718 | A | * | 10/1961 | Hackenberger, Jr. | 244/134 R |
| 3,013,752 | A | * | 12/1961 | Rush | 244/134 R |
| 3,420,476 | A | * | 1/1969 | Schultz et al. | 244/134 D |
| 3,517,900 | A | * | 6/1970 | Roussel | 340/962 |
| 3,982,092 | A | * | 9/1976 | Marriott | 219/203 |
| 3,984,699 | A | * | 10/1976 | Bailey | 307/41 |
| 4,036,457 | A | * | 7/1977 | Volkner et al. | 244/134 D |
| 4,292,502 | A | * | 9/1981 | Adams | 219/483 |
| 4,310,770 | A | * | 1/1982 | Keener et al. | 307/35 |
| 4,386,749 | A | * | 6/1983 | Sweet et al. | 244/134 D |
| 4,410,794 | A | * | 10/1983 | Williams | 219/486 |
| 5,206,806 | A | | 4/1993 | Gerardi et al. | |
| 5,351,918 | A | * | 10/1994 | Giamati et al. | 244/134 D |
| 5,475,204 | A | * | 12/1995 | Giamati et al. | 219/548 |
| 5,657,951 | A | * | 8/1997 | Giamati | 244/134 D |
| 5,763,858 | A | | 6/1998 | Jones | |
| 5,772,153 | A | * | 6/1998 | Abaunza et al. | 244/134 F |
| 5,904,322 | A | * | 5/1999 | Giamati et al. | 244/134 B |
| 5,921,502 | A | * | 7/1999 | Al-Khalil et al. | 244/134 R |
| 5,947,418 | A | * | 9/1999 | Bessiere et al. | 244/134 D |
| 6,129,314 | A | * | 10/2000 | Giamati et al. | 244/134 R |
| 6,181,235 | B1 | * | 1/2001 | Smith | 318/696 |
| 6,227,492 | B1 | * | 5/2001 | Schellhase et al. | 244/134 D |
| 6,338,455 | B1 | * | 1/2002 | Rauch et al. | 244/134 D |
| 6,753,513 | B2 | * | 6/2004 | Goldberg et al. | 219/497 |

FOREIGN PATENT DOCUMENTS

EP     0680878     11/1995

* cited by examiner

*Primary Examiner*—Michael R Mansen
*Assistant Examiner*—Joshua J Michener
(74) *Attorney, Agent, or Firm*—Young & Thompson

(57) ABSTRACT

A anti-icing/de-icing device for an aircraft wing includes at least one aerodynamic surface, e.g. a rotorcraft blade or an airplane wing, the aerodynamic surface possessing at least two anti-icing/de-icing modules 17, with each module 17 being provided with a respective heater element 54. In addition, the heater elements 54 of the modules 17 are powered electrically by a common electrical power supply member 1, each anti-icing/de-icing module acting against icing in its own zone independently of the other module(s).

12 Claims, 4 Drawing Sheets

MODULAR ANTI-ICING/DE-ICING DEVICE FOR AN AERODYNAMIC SURFACE

The present invention relates to a modular anti-icing/de-icing device for an aerodynamic surface. More particularly, the aerodynamic surfaces concerned are those having an aerodynamic profile that must not be disturbed by the formation of ice. Such aerodynamic surfaces correspond in particular to the blades of a rotorcraft (main rotor and antitorque rotor) or indeed the wings of an airplane.

BACKGROUND OF THE INVENTION

The problem of such aerodynamic surface icing is well known in the aviation industry. The aerodynamic profile of such a surface can become modified by ice forming thereon, as a result of the flying aerodynamic surface encountering droplets of super-cooled water contained in the atmosphere.

This problem is often treated by fitting the aerodynamic surface with a heater structure.

To do this, e.g. in a rotorcraft, a plurality of heater resistances are embedded in the blades of the main rotor and of the tail rotor. In order to reduce significantly the amount of electricity consumed, the various resistances are powered cyclically, and not simultaneously.

Document EP 0 014 334 discloses a device of that type which delivers electricity sequentially and cyclically to a plurality of anti-icing/de-icing modules. Each module is physically and electrically powered independently of the others. Consequently, the connections between the modules and the power switch unit comprise a large number of cables, which is extremely penalizing in terms of weight.

Concerning electricity consumption, each module is powered cyclically for a determined length of time in order to ensure that the temperature at the skin of the blade is sufficiently high. Nevertheless, because of variations in the flow of air over the aerodynamic surface, because of the possible presence of water or ice, and because of the absence of the temperature of the heater element being servo-controlled, it can happen that the blade is heated excessively, which can lead in the end to the skin or the internal structure of the blade being destroyed.

OBJECTS AND SUMMARY OF THE INVENTION

An object of the present invention is to propose an active anti-icing/de-icing device that is effective regardless of the icing conditions encountered in flight, and that makes it possible to overcome the limitations of the above-mentioned de-icers.

The invention provides an anti-icing/de-icing device for an aircraft wing, said wing including at least one first aerodynamic surface possessing at least two anti-icing/de-icing modules, each module being provided with a respective heater element. The invention is remarkable in that the heater elements of said modules are powered electrically via a common electrical power supply means, each anti-icing/de-icing module acting against icing in its own zone independently of the other module(s).

It is also advantageous for the anti-icing/de-icing device to possess one or more of the following characteristics:

- at least two heater elements for the same aerodynamic surface are controlled by the same regulator unit;
- the regulator unit dialogs with at least two heater elements of the same aerodynamic surface via secondary communications means arranged in the aerodynamic surface;
- each heater element is controlled by its own regulator unit;
- the regulator unit causes electrical power to be supplied to at least one heater element when a first measurement signal from at least one temperature sensor lies below a predetermined trigger threshold;
- the regulator unit receives a monitoring signal coming from at least one ice sensor, the regulator unit electrically powering the heater element depending on the monitoring signal;
- the regulator unit is connected to a central processor unit via a main communications means;
- for an aerodynamic surface provided with a control unit at its base that is connected to the central processor unit via a main communications means, the control unit is connected to each regulator unit of the aerodynamic surface via the secondary communications means;
- the central processor unit includes a diagnosis connector element and a central microprocessor with its memory and interfaces;
- the regulator unit is made on a flexible medium that is easily integrated in the aerodynamic surface;
- the temperature sensor is made on a flexible medium;
- the control unit is made on a flexible medium;
- the heater element is made on a flexible medium;
- the heater element comprises a switch member and a heater surface;
- the heater surface includes at least two heater sections;
- the electrical power supply means is provided with redundancy for safety reasons;
- the main and secondary communications means are made up of two buses using a both-way protocol;
- the main and secondary communications means are optical fibers;
- the main and secondary communications means use a wireless data transmission mode; and
- the electrical power supply means and the main communications means are constituted by a single carrier cable.

BRIEF DESCRIPTION OF THE DRAWINGS

The invention and its advantages will appear in greater detail from the following description of embodiments given by way of illustration and with reference to the accompanying figures, in which.

MORE DETAILED DESCRIPTION

Elements present in two or more distinct figures are given a single reference that is the same in all of those figures.

Figure 1:
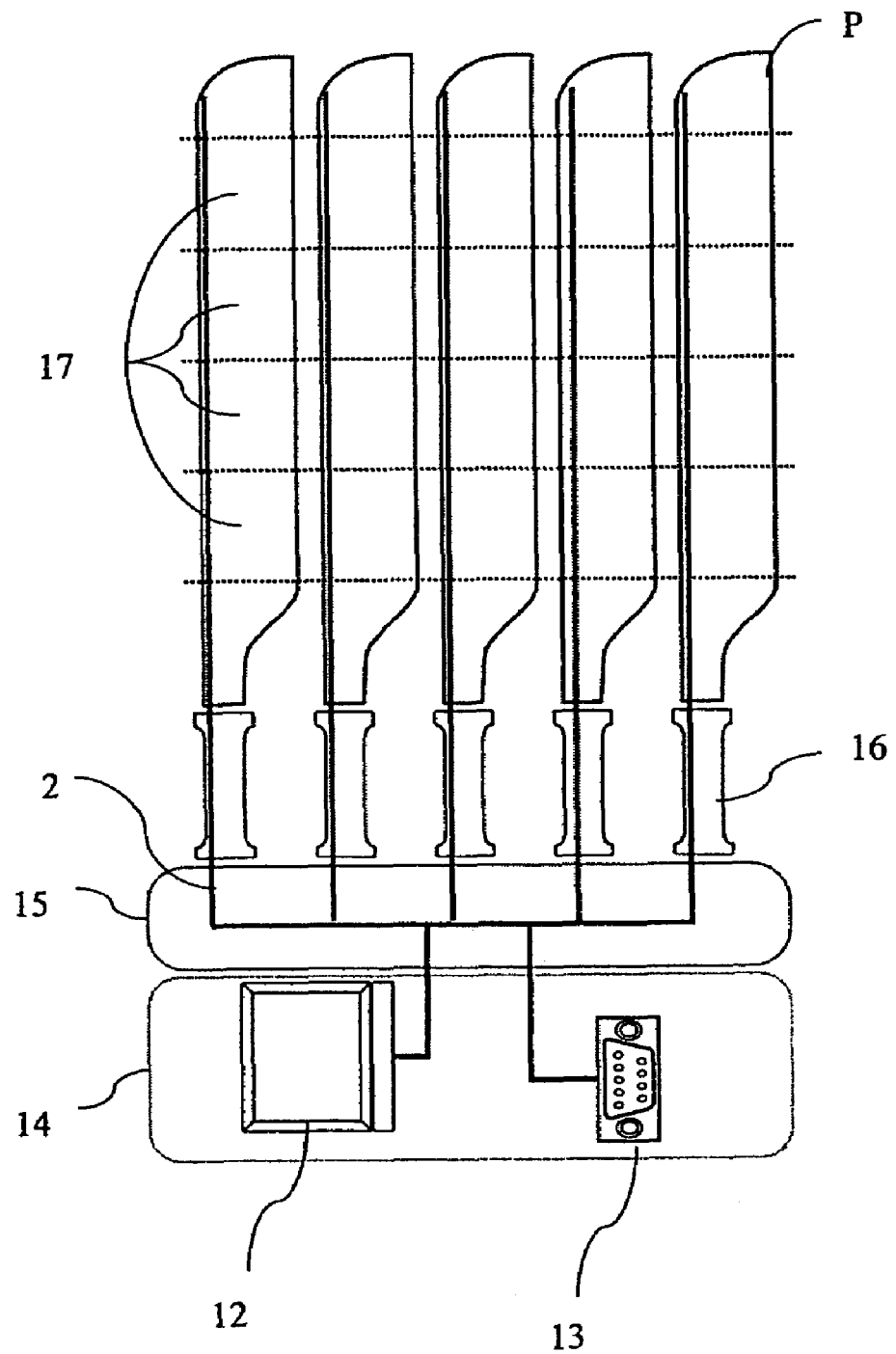
FIG. 1 is a diagram of the general architecture of an anti-icing/de-icing device for a rotorcraft having four anti-icing/de-icing modules on each of five blades of the rotorcraft.

FIG. 1 shows the various members of an anti-icing/de-icing system for a rotorcraft having five blades P, said members comprising a central processor unit 14 having a diagnosis connector element 13 and a central microprocessor 12 with its memory and interfaces, a rotary connector 15 of conventional type for delivering both electrical power and communications between the fuselage and the rotating rotor of the rotorcraft, five harnesses 16 each containing a redundant electrical power supply means, and a main communications means 2.

In addition, each blade is fitted with four anti-icing/de-icing modules 17 distributed over the span of the blade. The number of these modules could be different and adjusted as a function of the length of the span's blade. Each module 17 provides anti-icing/de-icing in its own zone, independently of the adjacent modules. Thus, the anti-icing/de-icing of the blade is genuinely modular since, depending on needs, a first portion of the blade can be de-iced, for example, a second portion can be anti-iced, while no anti-icing/de-icing action is being taken in third and fourth portions of the blade.

The central processor unit 14 dialogs with each module 17 via a single main communications means 2. This main communications means 2 is advantageously a bus making use of a both-way communications protocol, for example of the control area network (CAN) type. The central processor unit 14 can thus have access to all of the data (temperature, presence of ice) held by the modules 17. Consequently, it becomes possible to provide a display in the cockpit of blade temperatures and to verify, for maintenance or safety purposes, that the components constituting the modules 17 are operating properly, but without it being necessary to take action on the modules 17 or the blades. Such a display can also be implemented by connecting a computer to the diagnosis connector element 13.

Using a control unit located in the cockpit, the pilot can thus act via the central microprocessor 12 to modify in real time, by programming, the thresholds at which the anti-icing/de-icing device triggers as a function of the severity of icing.

The modules 17 in a single blade are powered electrically by a single power supply means, a single electrical power supply cable for example, whereas in the past it was necessary to have one cable per module. This considerably reduces the number of cables and consequently the weight and the cost of the harnesses, of the rotary connector, and also of electrical connectors.

In order to satisfy the safety requirements that are applicable to this function, the electrical power supply means must be redundant. In the event of one of the power supply means breaking down, the modules will continue to be powered electrically.

Figure 2:
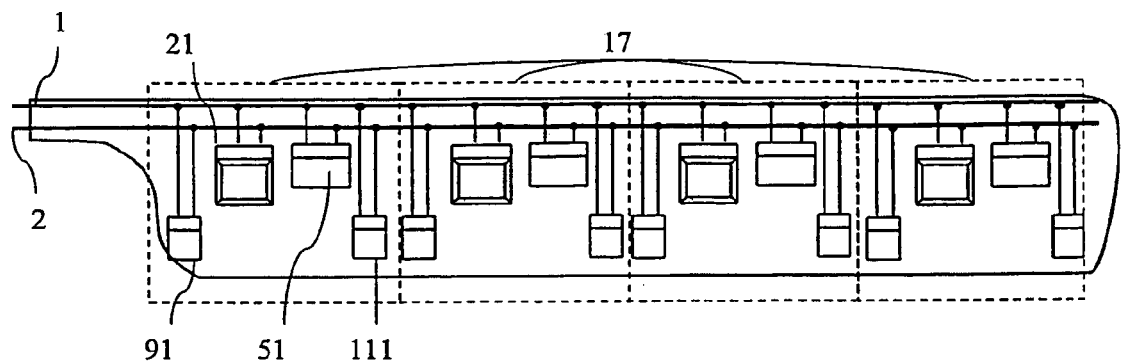
FIGS. 2 to 5 show a blade fitted with four anti-icing/de-icing modules embodied in four different ways.

FIG. 2 shows a first embodiment. Each module 17 is fitted with a first regulator unit 21, e.g. a peripheral microprocessor. This first regulator unit 21 receives a first measurement signal from a temperature sensor 91 and a first monitoring signal from an ice sensor 111 in order to control a first heater element 51. All of these components are provided with respective CAN interfaces and they are connected to the main communications means 2.

The system relies on the single main communications means 2 which makes it much easier to implement. In addition, all of the modules 17 in a given blade are powered by a single electrical power supply means 1, e.g. an electrical power supply cable.

Figure 3:
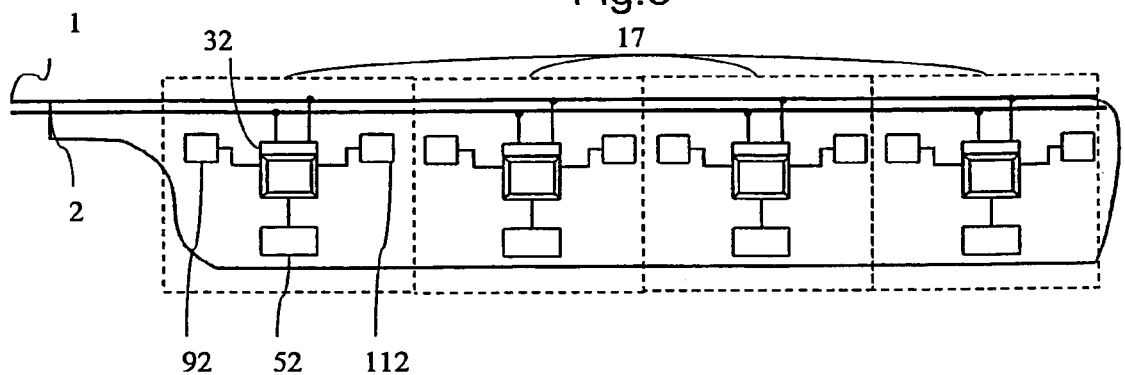

FIG. 3 shows a second embodiment. Each module 17 is provided with a second regulator unit 32, e.g. a microcontroller, connected to the main communications bus 2 and provided with a CAN interface. This second regulator unit 32 receives a second measurement signal from a temperature sensor 92 and a second monitoring signal from an ice sensor 112 in order to control a second heater element 52.

In addition, by implementing a microcontroller, it is possible to achieve better integration of the peripheral elements (temperature sensors, ice sensors, and heater elements). Each of these peripheral elements is identifiable by its predefined connection to one of the pins of the microcontroller. The anti-icing/de-icing modules are completely independent. The microcontroller dialogs via the main communications means 2 with the central microprocessor 12 or the diagnosis connector 13, thereby facilitating tests and maintenance operations.

This second embodiment considerably reduces the number of components connected to the main communications means 2. Data can therefore be transmitted at a much higher rate.

Figure 4:
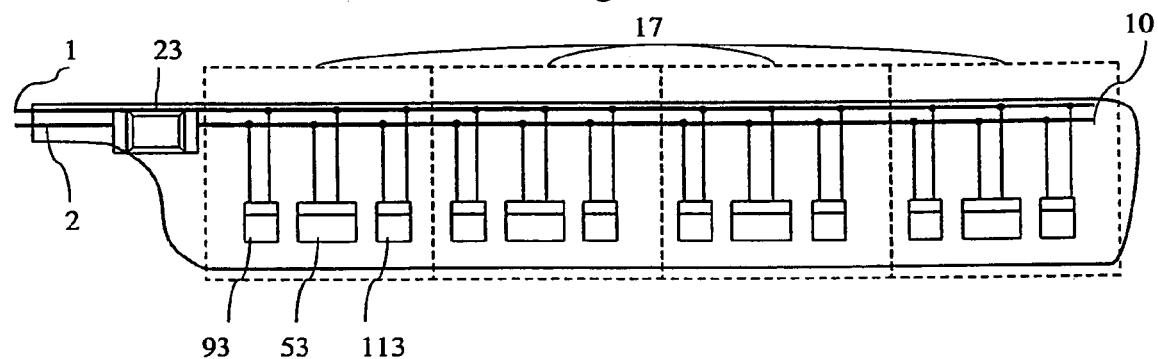

FIG. 4 shows a third embodiment. In this case, a third regulator unit communicates with all of the modules 17 of the blade. This third regulator unit 23 provided with two CAN interfaces, an auxiliary microprocessor for example, is disposed at the root of the blade. The two CAN interfaces enable a gateway to be established between the main communications means 2 and a secondary communications means 10 which is advantageously a bus using a both-way protocol. Consequently, the third regulator unit 23 is connected to the central microprocessor 12 via the main communications means 0.2, and also to the various anti-icing/de-icing modules 17 of the blade via the secondary communications means 10 specific to the blade.

Each module 17 is provided with a temperature sensor 93, an ice sensor 113, and a heater element 53, with each of these components being provided with a respective CAN interface enabling it to be connected to the secondary communications bus 10. These temperature sensors 113 and ice sensors 93 inform the third regulator unit 23 which controls the heater element 53 accordingly.

Figure 5:
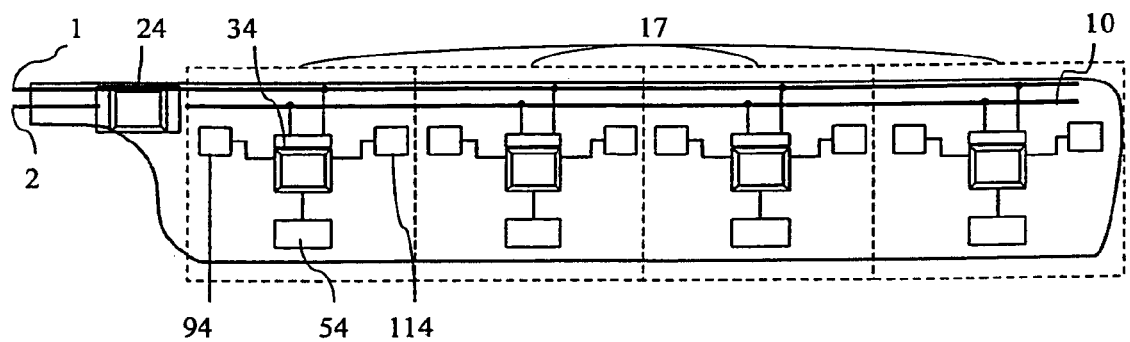

FIG. 5 shows a fourth embodiment that is particularly advantageous. A fourth regulator unit 34 is specific to each module 17 of the blade. In addition, a control unit 24 common to all of the modules of the blade is connected at the root of the blade. This control unit 24 comprises an auxiliary microprocessor having two CAN interfaces, one connected to the main communications means 2, and the other to the secondary communications means 10. The fourth regulator unit 34 comprising a microcontroller having a CAN interface connected to the bus 10 receives a fourth measurement signal from a temperature sensor 94 and a fourth monitoring signal from an ice sensor 114 in order to control the heater element 54.

This architecture provides the advantage of providing a central function at the root of the blade. The informations picked up by the sensors (temperature, presence of ice) are transferred to the central microprocessor 12 via the main communications means 2 by the control unit 24. This makes it possible for the pilot to access these datas.

Figure 6:
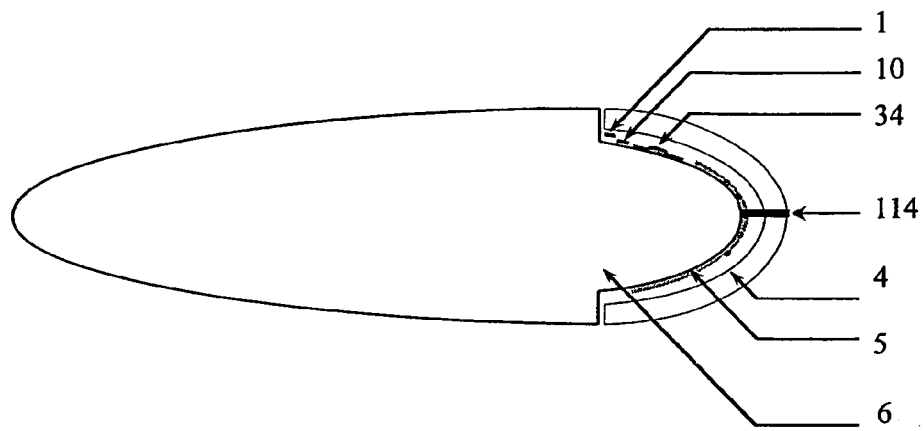
FIG. 6 is a cross-section through a segment of a blade provided with an anti-icing/de-icing module.
Figure 7:
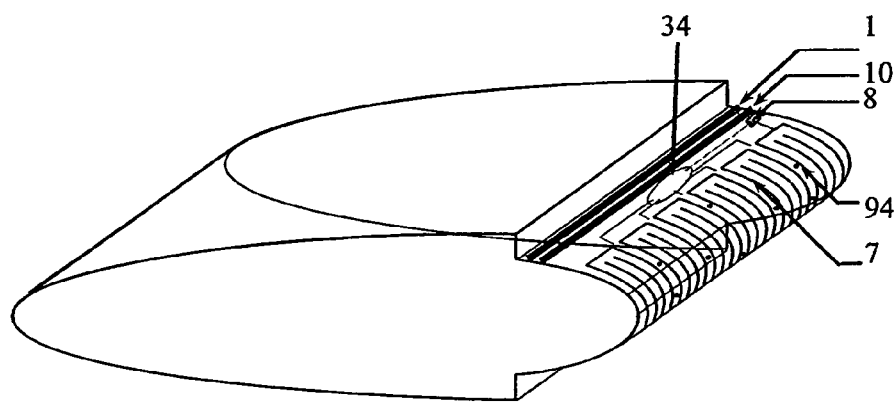
FIG. 7 is an isometric view of a segment of a blade provided with an anti-icing/de-icing module.
Figure 8:
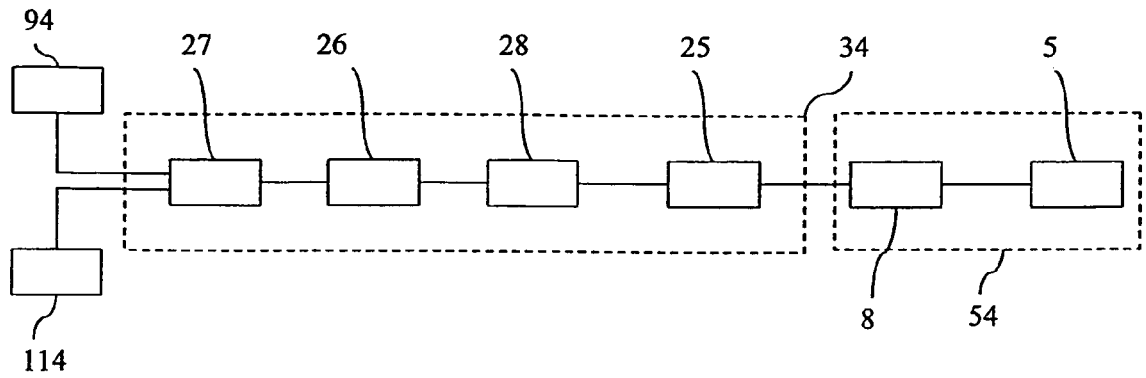
FIG. 8 is a block diagram of an anti-icing/de-icing module.

With reference to FIGS. 6, 7, and 8, each anti-icing/de-icing module 17 is partially embedded in a segment of blade between its core 6 and the leading edge cladding 4 of the segment. The ice sensor 114 needs to remain in contact with ice in order to be able to operate, so it is not inserted into the blade, but is located on the skin of the blade.

The temperature sensors 94 pick up the temperature of the blade in their respective detection zones, each sending a fourth measurement signal in the form of an analog voltage to an input port of the fourth regulator unit 34.

In like manner, a fourth monitoring signal is delivered by the ice sensor 114.

In order to be able to use all of these signals, the fourth regulator unit 34 includes an analog-to-digital converter 27. This fourth regulator unit 34 also possesses a correlator member 26 enabling it to determine whether information is valid, and then to determine the mean temperature of the blade segment. In the event of lack of coherence (temperature high even though the presence of ice has been detected, large differences between two different temperature sensors), an alarm is returned to the central processor 12. In the same manner, this validation procedure can be implemented by the control unit 24 or even by the central microprocessor 12.

Various operating conditions are established in order to optimize the power consumed by the heater element 54, said heater element 54 being-constituted by a switch member 8 and a heater surface 5. For this purpose, regulation thresholds are predefined in a conversion table 28. By way of example, the following temperature ranges are imposed in arbitrary manner:

greater than 80° C.: this range does not correspond to a normal operating temperature of the blade. Consequently, a malfunction alarm is sent to the central processor unit 14 via the central microprocessor 12 or the diagnosis connector element 13;

5° C. to 80° C.: no ice, the heater element 54 should not be activated;

−5° C. to 5° C.: limited icing conditions, low level de-icing can be implemented, which is equivalent to anti-icing;

−15° C. to −5° C.: icing conditions confirmed, medium level de-icing;

−60° C. to −15° C.: severe icing conditions, powerful de-icing; and below −60° C.: this range does not correspond to normal operating temperatures for the blade. Consequently, a malfunction alarm is sent to the central processor unit 14 via the central microprocessor 12 or the diagnosis connector element 13.

These various temperature ranges are given by way of example. They can be modified at any time by operators, in flight or on the ground, depending on weather conditions.

Once a rate of de-icing has been selected, the table 28 sends a digital signal to the digital-to-analog converter 25 of the fourth regulator unit 34 which forwards an analog voltage to the power switch member 8 of the heater element 54.

The switch member 8 may be constituted by a metal oxide semiconductor (MOS) transistor, a metal oxide semiconductor field effect transistor (MOSFET), an insulated gate bipolar transistor (IGBT), or a gate turn off (GTO) thytistor. Depending on the voltage received, the switch member 8 delivers more or less power to the heater surface 5.

The analog signals from the various sensors are thus delivered to the fourth regulator unit 34 which analyses the data, processes it, and generates outputs that are directly applicable to the switch member 8, which then controls the power dissipated by the heater surface 5.

Each anti-icing/de-icing module 17 thus operates independently and is managed independently of the others. A break in the main communications bus 2 or in the secondary communications bus 10 will consequently have no incidence on the anti-icing/de-icing function which will continue to be provided without the blade being destroyed.

Figure 9:
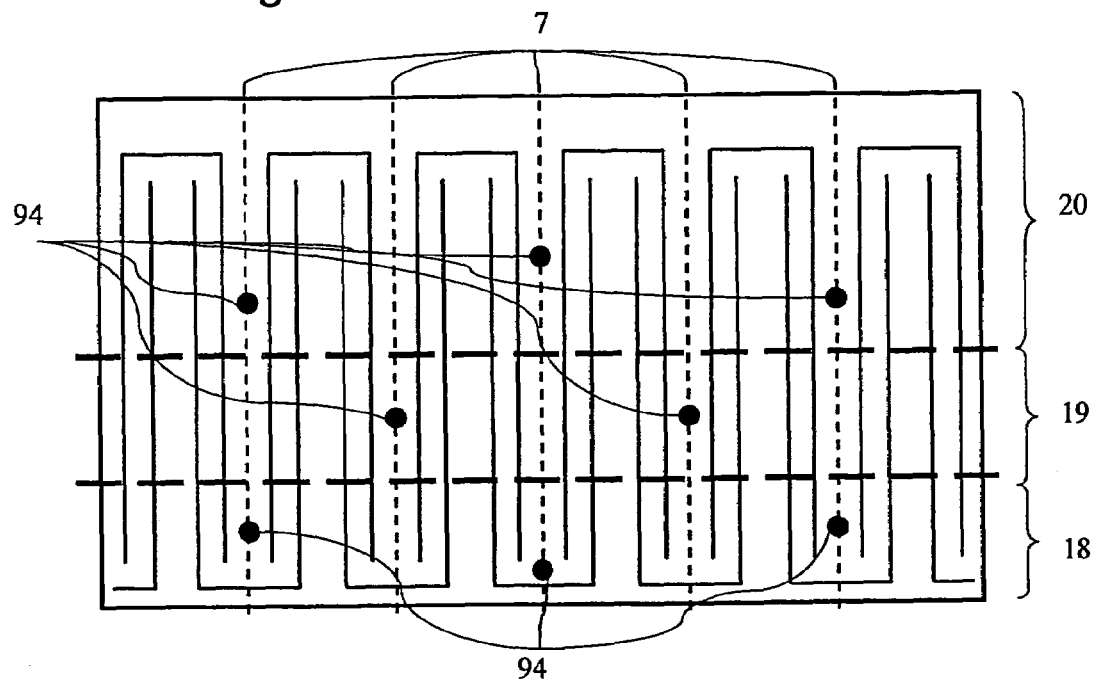
FIG. 9 is a view of a heater element provided with temperature sensors.

Preferably, and as shown in FIG. 9, the heater surface 5 is made on a flexible medium, that also has placed thereon the temperature sensors 94. The sensors are installed in non-heating zones 7 so as to reproduce accurately the temperature of the blade. Because the heater surface 5 is flexible, it can be applied to the leading edge of a blade and match its shape.

In the same manner, the regulator unit, the control unit, and the temperature sensors are all made on flexible media so as to make them easier to integrate in the blade.

Figure 10:
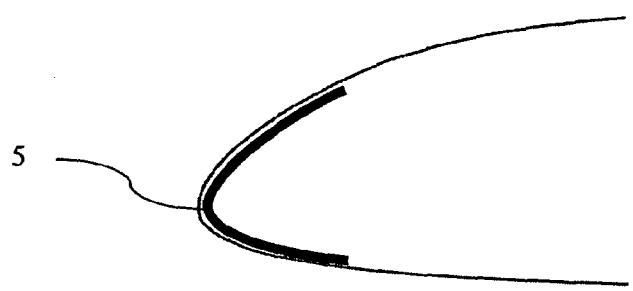
FIG. 10 is a cross-section of a heater section provided with a heating section.

With reference to FIG. 10, the heater surface 5 has only one heater section.

Figure 11:
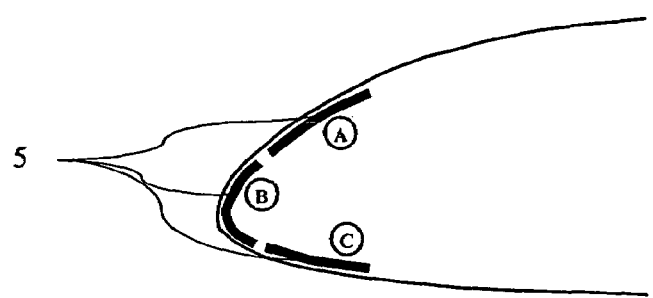
FIG. 11 is a cross-section of a heater section provided with three heater sections.

However, with reference to FIG. 11, and advantageously, the heater surface 5 comprises three heater sections A, B, and C. Experience shows that ice formation is more severe on the leading edge 19 than on the top 20 or lower 18 surface of the blade. Consequently, the regulator unit delivers more power to the surface B than to the surfaces A and C, thereby enabling electricity consumption to be optimized.

In a first variant of these embodiments, a single ice sensor is provided that is installed at the root of the blade instead of one sensor per module.

In a second variant of these embodiments, in order to optimize further the integration of the main and secondary communications means 2 and 10 in the blade, it is advantageous to make use of optical fibers capable of conveying binary information. A rotary connector 15 operating with an optical system is then preferably used, thereby correspondingly reducing the risks of wear due to fatigue.

In a third variant of these embodiments, the main and secondary communications means 2 and 10 make use of a wireless type data transmission mode.

In a fourth variant of these embodiments, the main and secondary communications means 2 and 10 and the electrical power supply means 1 are constituted by a single carrier cable. The carrier cable makes use of carrier current technology which consists in superposing coded information, in particular information encoded using frequency modulation, on power supply current.

In a penalizing mode of operation, it is possible to envisage that all of the modules of the apparatus are activated at full power and simultaneously. Under such conditions, the alternator of the aircraft may be under-dimensioned. That is why, depending on the total power per unit area that is to be achieved, the central microprocessor may force the regulator units to operate in a known sequential mode.

Naturally, the present invention can be implemented in a wide variety of ways. Although several embodiments are described above, it will be understood that it is not conceivable to identify all possible embodiments in exhaustive manner. Any means described may naturally be replaced by equivalent means without going the ambit of the present invention.

What is claimed is:

1. An anti-icing/de-icing device for an aircraft wing, comprising:
 a common power supply connection in the wing;
 a common communication connection in the wing;
 at least two separate anti-icing/de-icing modules on an aerodynamic surface of the wing,
 each of said modules having a respective microprocessor connected to said common communication connection and to said common power supply, a respective heater element that is connected to said microprocessor, a respective ice sensor that communicates with said microprocessor, and a respective temperature sensor that communicates with said microprocessor,
 wherein each said microprocessor is arranged to operate said respective heater element in response to inputs from said respective ice and temperature sensors, and
 wherein each said microprocessor is managed independently of every other said microprocessor in the other module(s).

2. A device according to claim 1, wherein said microprocessor causes electrical power to be supplied to said heater element when a first measurement signal from said temperature sensor lies below a predetermined trigger threshold.

3. A device according to claim 1, wherein said microprocessor receives a monitoring signal coming from said ice sensor, said microprocessor electrically powering said heater element depending on said monitoring signal.

4. A device according to claim 1, wherein said microprocessor is made on a flexible medium that is integrated in the aerodynamic surface.

5. A device according to claim 1, wherein said temperature sensor on a flexible medium.

6. A device according to claim 1, wherein said heater element is made on a flexible medium.

7. A device according to claim 1, wherein said heater element comprises a switch member and a heater surface.

8. A device according to claim 1, wherein said heater element includes at least two heater sections.

9. A device according to claim 1, wherein said common power supply connection is made in redundant manner.

10. A device according to claim 1, wherein said microprocessor is connected to a central processor unit via said common communication connection.

11. A device according to claim 10, wherein said central processor unit includes a diagnosis connector element and a central processor together with its memory and interfaces.

12. A method of anti-icing/de-icing an aircraft wing, the wing including at least one first aerodynamic surface possessing at least two anti-icing/de-icing modules, each module being provided with a respective microprocessor, a respective ice sensor, a respective temperature sensor, and a respective heater element, the method comprising:
  electrically powering the heater elements of said modules via a common electrical power supply connection in the wing;
  operating each said respective heater element by said respective microprocessor in response to inputs from said respective ice and temperature sensors; and
  managing each said microprocessor independently of every other said microprocessor in the other module(s).

* * * * *